United States Patent [19]
Cafarella et al.

[11] Patent Number: 6,067,313
[45] Date of Patent: May 23, 2000

[54] WIRELESS COMMUNICATIONS SYSTEM FOR TRANSMITTING AND RECEIVING DATA WITH INCREASED DATA RATES AND ROBUSTNESS

[75] Inventors: John H. Cafarella, Swampscott; Jeffrey H. Fischer, Boston, both of Mass.

[73] Assignee: Micrilor, Inc., Wakefield, Mass.

[21] Appl. No.: 09/102,416

[22] Filed: Jun. 22, 1998

Related U.S. Application Data

[60] Provisional application No. 60/050,511, Jun. 23, 1997.

[51] Int. Cl.[7] .............................. H04B 1/69; H04B 1/707
[52] U.S. Cl. ......................... 375/130; 375/142; 375/146; 375/150
[58] Field of Search ................................... 375/200, 206, 375/208, 209, 210, 259, 295, 308, 130, 142, 150, 146; 370/209

[56] References Cited

U.S. PATENT DOCUMENTS

| | | |
|---|---|---|
| 3,697,697 | 10/1972 | Audretsch, Jr. et al. . |
| 4,403,331 | 9/1983 | Halpern et al. . |
| 5,029,184 | 7/1991 | Andren et al. . |
| 5,555,268 | 9/1996 | Fattouche et al. ............... 375/206 |
| 5,745,525 | 4/1998 | Hunsinger et al. ............... 375/285 |

*Primary Examiner*—Don N. Vo
*Attorney, Agent, or Firm*—McDermott, Will & Emery

[57] ABSTRACT

A data communications system for conveying a series of input data symbols includes a transmitter subsystem and a receiver subsystem. The transmitter subsystem generates a series of composite waveforms corresponding to a series of input data symbols by selecting from a set of mutually orthogonal component waveforms, then combines contemporaneous portions of at least two of the component waveforms so as to form a composite waveform which is unique to the data symbol. The transmit subsystem uses the composite waveform to modulate a carrier signal and transmits the carrier signal over a communications channel. The receiver subsystem receives the carrier signal and recovers the composite waveform from the carrier signal. The receiver subsystem identifies the data symbol by, at least in part, decompositioning the composite waveforms into their constituent component waveforms so as to identify which composite waveforms have been transmitted.

45 Claims, 10 Drawing Sheets

WIRELESS COMMUNICATIONS SYSTEM FOR TRANSMITTING AND RECEIVING DATA WITH INCREASED DATA RATES AND ROBUSTNESS

CROSS-REFERENCE TO RELATED APPLICATIONS

This application is based on provisional application Ser. No. 60/050,511 filed Jun. 23, 1997, the prior application being incorporated herein by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention relates to data transmission systems, and more particularly, wireless data transmission systems which achieve high data transfer rates with robust performance.

BACKGROUND OF THE INVENTION

Generally, in transmitting digital information over a wireless communication channel, a data transmitter uses data transformation techniques for transforming a sequence of discrete information symbols representing the digital information into a continuous waveform on a carrier for transmission over the channel to a data receiver. The receiver reverses the transmit process using complementary techniques in order to recover the original information sequence. Often, the transmitter performs a sequence of sub-transformations during the transformation process, depending upon the synthesis approach employed. The synthesis approach, for example, comprises source encoding, error-control encoding, waveform generation, and frequency translation. For present, illustrative purposes, the overall transmitter process will be referred to as "modulation", and the receiver process will be referred to as "demodulation". Two goals of a communications system design is to effect this modulation/demodulation for an intended communications channel with a high throughput of data, i.e., the transmission of data at a data transfer rate as high as possible within the bandwidth limitations imposed by the communications channel, and with an adequately low probability of corruption or loss of the information.

In many applications, the frequency bandwidth within which the data is transmitted is limited by government regulations (such as those imposed in the United States by the Federal Communications Commission, or FCC), so when designing a system emphasis is placed on transmitting data at higher data rates within the allotted band of frequencies. For example, when designing wireless computer networks, such as a local area network (LAN), the FCC currently has allocated about 80 MHZ of bandwidth for local transmission and reception for unlicensed transmitters. If data occupies a relatively small bandwidth of frequencies (e.g., voice data would occupy 20 KHz worth of bandwidth), one can utilize the entire allocated bandwidth to widen the transmitted data (or spread the spectrum of the data) to make the transmission more robust. For some modulation techniques, more bandwidth allows for faster transmission of binary symbol data at faster rates. However, as the data rate of the binary symbols increases, multipath interference becomes more of a problem to the point where the faster data will become difficult if not incomprehensible to understand as the data is received at the receiver. Accordingly, designs often slow down the rate at which data is transmitted so that the data can be understood without concern of multipath interference.

In general, different values of input data to be transmitted can be thought of as respectively representing different symbols with the total number of possible symbols representing a signaling alphabet. Each data input symbol therefore can be represented by a unique waveform which can be transmitted through a transmission medium. By serially transmitting these waveforms (representing a series of data input symbols) one can transmit a message that conveys meaning. The waveform representing each symbol and transmitted through the medium thus must be uniquely recognizable, and must be selected from a set of possible unique waveforms used to represent the possible symbols of the signaling alphabet. The number of possible symbols in a signaling alphabet is referred to as the order of the alphabet. Thus, one approach to increasing data transfer rates is to use a higher-order signaling alphabet to represent the input data with a corresponding number of unique waveforms for transmitting the information through the transmission medium.

A data transmitter capable of robustly transmitting data at high data rates by using a higher-order signaling alphabet is described in our prior application U.S. application Ser. No. 08/369778 entitled a High-Data-Rate Wireless Local-Area Network filed Dec. 30, 1994, and assigned to the present assignee (the "Pending Application"), which application is a continuation-in-part of U.S. application Ser. No. 08/198,138, filed Feb. 17, 1994, now abandoned. The Pending Application describes an improved data transmitter and receiver in which one preferred embodiment uses a direct sequence, spread spectrum (DSSS) signal format when communicating between the two devices. The preferred system uses unique digital waveforms forming a relatively high-order signaling alphabet to communicate between the two devices. These waveforms comprise a set of unique waveforms, which are mutually orthogonal with respect to one another. By using a set of 16 unique waveforms, for example, sixteen different symbols can be represented. Having a choice of one of 16 waveforms thus accounts for 4 binary bits for representing 16 different data input symbols since four bits, or $2^4$, has 16 possible values.

The result is to greatly increase the available data rates for wireless LANs while maintaining power efficiency and robustness in the presence of a multipath environment. This can be contrasted to prevailing "digital-radio" techniques employed on telephone microwave trunking links, which use Quadrature Amplitude Modulation (QAM), and which are very bandwidth efficient, but which are very power inefficient and would degrade terribly in multipath typical of LAN environments.

Accordingly, it is desirable to provide faster data rates while maintaining power efficiency with robustness in the presence of a multipath environment.

SUMMARY OF THE INVENTION

In accordance with one aspect of the present invention, a group of waveforms for transmitting data through a transmission medium is provided. The waveforms of the group correspond, at least in part, to unique data symbols values, wherein each of the data symbols is represented, at least in part by a waveform, herein referred to as the composite waveform, derived as a function of:

(A) selecting K waveforms from a set of M mutually orthogonal component waveforms so as to produce K selected component waveforms for each of the data symbols, wherein $2 \leq K \leq M-1$; and (B) processing contemporaneous portions of the K selected waveforms so as to produce, at least in part, the composite waveform representative of the symbol.

In accordance with one embodiment of the present invention, each of the composite waveforms is derived as a function of:

(A) grouping the M component waveforms into n subsets, each subset including m component waveforms;

(B) selecting at least one waveform from each subset of n subsets of the waveforms so as to produce K selected orthogonal component waveforms; and (C) processing contemporaneous portions of the K selected orthogonal waveforms so as to produce the composite waveform representative of at least a part of the symbol.

In accordance with one embodiment of the present invention, the composite waveform is used to modulate a carrier signal so as to produce a modulated carrier signal for transmitting the composite waveform through the transmission medium. It is a further specific embodiment, the composite waveform is derived from two intermediate composite waveforms, which in turn are each at least in part derived from K selected waveforms, and the modulated carrier signal is produced as a function of:

(A) simultaneously transmitting the two intermediate composite waveforms respectively through an in-phase path and a quadrature path coupled to one another so as to produce a in-phase modulated waveform and a quadrature modulated waveform, the two modulated waveforms being 90° out of phase with respect to one another; and (B) combining the in-phase modulated waveform and the quadrature modulated waveform so as to produce a quadrature phase modulated carrier signal.

In accordance with another embodiment, the intermediate waveform from the in-phase path is encoded with a first spreading function, and the intermediate waveform from the quadrature path is encoded with a second spreading function.

As a further embodiment, the individual component waveforms can be selectively inverted so as to create a larger set of composite waveforms.

In another embodiment the component waveforms are selectively inverted using PSK techniques, while in another embodiment the waveforms are selectively inverted using DPSK techniques.

In still another embodiment, the orthogonal waveforms include Walsh functions.

In yet another embodiment, n and m each equal 4 so that the set of M waveforms includes four subsets, each having four of the Walsh functions. In another embodiment, n equals 2 and m equals 8 so that the set of M waveforms includes two subsets, each having eight of the Walsh functions.

In another embodiment, the waveforms are chosen so that the composite waveform is produced so as to have only two possible amplitude levels, and in another embodiment at least three possible amplitude levels.

As a further embodiment the composite waveform is multiplied by a spreading function, while in another embodiment, each of the K selected component waveforms is multiplied by a spreading function so as to produce K spread waveforms, prior to producing the composite waveform.

In accordance with another aspect of the present invention, a data communications system for and method of transferring data as predefined data symbols of the symbol alphabet are provided using composite waveforms generated in accordance with the teachings provided herein. The data communications system includes a transmitter subsystem and a receiver subsystem. The transmitter subsystem and receiver subsystem are equipped so as to respectively provide encoded composite waveforms so that the data can be transmitted through the medium, and decode the composite waveforms so that the data can be retrieved. Alternative embodiments of the transmitter subsystem and or receiver subsystem utilize the various embodiments of the method and systems described herein.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE INVENTION

Figure 1:
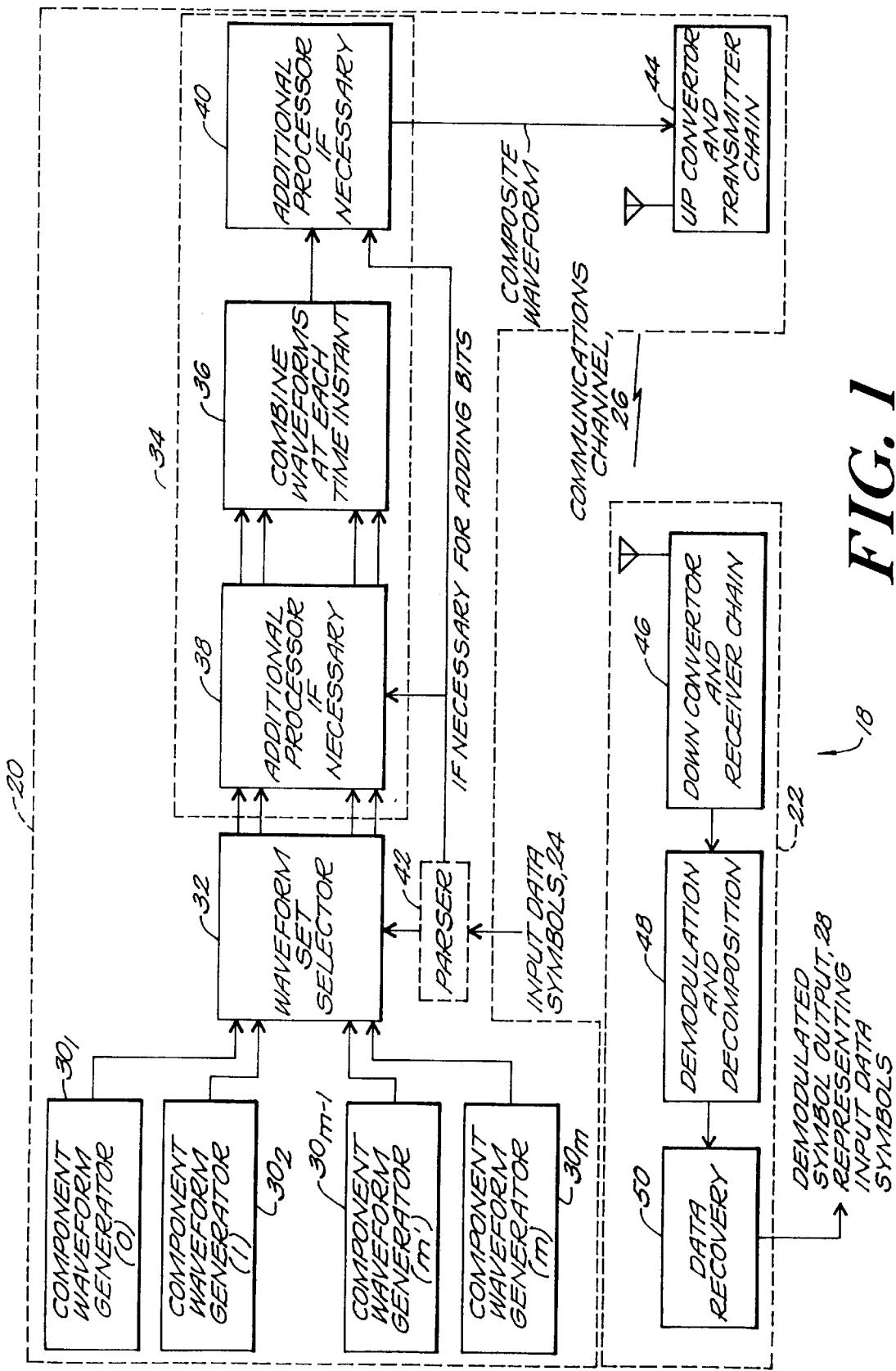
FIG. 1 shows a simplified block diagram of one embodiment of a data communications system designed in accordance with the present invention.

In the drawings the same numerals are used to refer to like or equivalent parts, and are provided for ease of exposition. Such references numerals are not intended to limit the invention as defined by the appended claims.

The invention is directed to a system for and method of achieving what is considered to be very high data rates through a communications channel such as a radio link, while still maintaining (a) high processing gain against multipath and interference, and (b) low symbol rates for protection against inter-symbol interference.

More specifically, in accordance with one aspect of the invention, the transmitter of the present invention includes a waveform generator that creates any one of a plurality of unique composite waveforms, each generated as a function of a plurality of unique, predefined component waveforms, each composite waveform (a) including K component waveforms selected from a waveform set of size M, wherein $2 \leq K \leq M-1$; and (b) representing, at least in part, one of the data input symbols. A unique aspect of this invention is the composite waveform generation from the predefined combinations of component waveforms. Each component waveform is created by simultaneously combining the chosen mutually-orthogonal component waveform functions. The combination of component waveform functions chosen for each composite waveform is unique with respect to the others so that the resulting composite waveform can be recognized as representing, at least in part, a corresponding data input symbol. As will be evident hereinafter, in accordance with one embodiment of the invention, the composite envelope is multi-level; while in accordance with another embodiment of the invention the possible mutually-orthogonal component waveforms that are combined for each possible composite waveform are chosen so that the envelope is always binary-level. These methods of generation assures high performance while transmitting a large number of bits/symbol, and allows a simple method of demodulation to be used. The carrier modulation means has sufficient dynamic range to support a linear transfer of the modulation to the carrier signal.

The foregoing may be better understood by the following: when only one of M mutually orthogonal waveforms is selected for transmission of each symbol bit as is described in the Pending Application, $\log_2 M$ bits of information are transmitted. If a predefined combination of K waveforms are transmitted simultaneously, then the number of bits transmitted is increased to:

$$\log_2 \frac{M!}{K!(M-K)!} \qquad (1)$$

bits of information per symbol. For example, if M=16 and K=2, then 6.9 bits/symbol are provided; while simultaneously sending 3 of 16 gives 9.1 bits/symbol. This offers higher data rates, but progressively incurs amplitude fluctuation and transmitted power increased by a factor of K. This modulation technique is hereinafter referred to as "K/M-Orthogonal", read "K of M Orthogonal", where in accordance with one aspect of the present invention $2 \leq K \leq M-1$. In order to exploit K/M-Orthogonal signaling it is necessary to develop an effective coding scheme for handling the fractional bit/symbol. Alternatively, one could round down the number of bits/symbol and use this to find a very simple encoding scheme. For example, for 2/16-Orthogonal exploiting 6 bits/symbol, the encoding could comprise two independent groupings of 8 mutually orthogonal functions in which picking 1 of 8 provided 3 bits from each symbol. (This is equivalent to 8/16-Orthogonal).

In general, the receiver of the present invention, recognizes the composite waveform as unique by recognizing the individual component waveforms so that the corresponding input data symbol can be identified.

FIG. 1 shows a simplified block diagram of one embodiment of a data communications system 18 in accordance with the present invention. This embodiment of the invention includes a transmitter subsystem 20 and a receiver subsystem 22. In general, the transmitter subsystem 20 receives a series of input data symbols at 24, generates composite waveforms representative the input data symbols, as a function of the K/M-orthogonal signaling technique, encodes the generated composite waveforms onto a carrier signal and transmits the carrier signal via a communications channel 26. The receiver subsystem 22 receives the carrier signal via the communications channel 26, decodes the composite waveforms from the carrier signal and produces decoded data symbols (which are a reproduction of the input data symbols) as output data elements 28.

More specifically, as shown in FIG. 1, the transmitted subsystem includes M different waveform generators 30 for respectively generating M mutually orthogonal signal waveforms. The waveforms are preferably Walsh function waveforms. With Walsh function waveforms, the outputs of the generators are each in the form of a binary waveform that proceeds in time. The outputs of the generators are all connected to the input of a waveform selector 32. The waveform selector 32 is responsible for determining how the waveforms are selected for each generated composite waveform. The selector 32 chooses a subset K of the M waveforms, wherein $2 \leq K \leq M-1$ based upon the instructions it receives from the portion the input data symbols 24 to be represented by the selected waveforms. One criterion of the selector, which will become more evident hereinafter, is that the possible combinations of K waveforms are all uniquely identifiable with respect to one another. In other words, there can be no repetition of subsets of the waveforms. For example, if K=2 and M=3, the possible selections for waveform sets are (3,2), (3,1), (3,0), (2,1), (2,0) and (1,0). Waveform sets (3,2) and (2,3), for example, are consider repetitious. Thus, in the example, there are six possible choices resulting in six possible outputs from the selector 32. The output waveforms selected by selector 32 are processed by the modular and processor 34. The latter preferably includes the signal combiner 36 for simultaneously combining the selected waveforms appearing at the outputs of the selector 32, resulting in at least a two level composite waveform. The combiner 36 preferably sums the waveforms in a linear fashion, however, the summations may be in accordance with other linear or non-linear functions. This composite waveform in the example given will be one of six possible and unique waveform symbols. The six possible composite waveforms results in less than 3 bits per symbol.

As will be more evident hereinafter, the modulator and processor 34 of the transmitter subsystem, preferably although not necessarily, also comprises either or both: means 38, coupled to each output of the waveform selector, for further processing each individual waveform, and/or means 40, coupled to the output of the summer 36, for further processing the composite signal output of the signal summer 36. Means 38 can be used, for example, to encode each of the individual outputs of the selector 32 with a separate coding signal, such as a spreading function, e.g., a PN code, independent of the data stream, for providing privacy as well as processing gain against another transmitter with the same data modulation, and assuring minimum modulation bandwidth properties. A similar result can occur if the output composite waveform from the summer 36 is modulated with a spreading function by the means 40.

Also evident hereinafter, is the fact that the means 38 and 40 can also be used to encode additional bits on each modulated output waveform of the transmitter subsystem, as will be evident hereinafter. Accordingly, in this latter instance, a parser is used to provide at least the relevant portions of the input data symbols 26 to the means 38 and 40 so that the proper values of the generated waveform symbols are generated through channel 26. For example, in accordance with yet another embodiment of the present invention, an additional bit is added using signal phase to K/M-Orthogonal to make K/M-Bi-Orthogonal. For example, for M=16 and K=2, K/M-Bi-Orthogonal provides 8.9 bits/symbol. By adding an additional bit using signal phase, the number of bits/symbol is increased to 9.9 bits/symbol. There are also both coherent and non-coherent implementations of K/M-Bi-Orthogonal. In addition, additional bits can be added by selectively inverting each of the component waveforms to make composite waveforms. This can be accomplished, for example, using PSK and DPSK modulation techniques. All of these modifications will be more evident hereinafter.

As illustrated in FIG. 1, once modulated, the modulated composite signal may then be upconverted, amplified and transmitted by the up converter and transmit chain 44 so that the modulated signal can be transmitted through channel 28. For example, the composite waveform output of the modulator and processor 34 can be used to modulate a carrier signal so as to produce a modulated composite signal for transmission over the transmission channel 26.

Upon reception by the receiver subsystem 22, the modulated composite signal is down converted and processed through the receive chain, generally indicated at 46, and subsequently applied to the demodulator 48. The latter demodulates and/or decompositions the received signal all in a manner complementary to the process of the transmitter subsystem 20, as will more evident hereinafter. Demodulation includes the process of removing the carrier signal, and processing the received composite waveform signal. If a separate coding, such as a spreading function, e.g., PN coding, is used in the transmitter subsystem, then the signal is decoded to remove the spreading function code. The K component waveforms present in the received composite waveform can then be determined, for example, using well known correlation techniques, as will be discussed in greater detail hereinafter. In addition, techniques used to encode the transmitted symbol with additional bits can be decoded. The data symbols 24 can then be recovered as indicated at 50 and provided as the output 28.

In one embodiment of the invention, it is possible to separate the basis functions into orthogonal subgroups. For example, instead of sending 8.9 bits per symbol by transmitting any 2 of 16 waveforms, it is possible to send waveforms representing 6 bits per symbol by transmitting one waveform from each of 2 groups of 8 waveforms, or 8 bits per symbol by transmitting one waveform from each of 4 groups of 4. These become even more attractive if Bi-Orthogonal signaling is considered. One could send waveforms representing 10 bits per symbol by using 4-ary Bi-Orthogonal on 4 subgroups of 16 basis functions. Progressively, more amplitude fluctuations are incurred as more subgroups are employed, and the average power required is proportional to the number of subgroups (a factor of M/N, or 3 dB per splitting). This can be called "N sub-divided M-Orthogonal" signaling, using the notation N(M)-Orthogonal, where N-Orthogonal is used in M/N basis functions (hence M is the total number of basis functions). This has an obvious extension to multiple waveforms (e.g., K/N(M)-Orthogonal) as well as to Bi-Orthogonal variants.

M-Orthogonal (or Bi-Orthogonal) waveforms can be used with either coherent or non-coherent receiver subsystems; that is, the receiver subsystem might make use of a locally generated coherent reference local oscillator, or it might employ processing appropriate for accommodating the unknown carrier phase at the receiver. In either case, the modulation at the transmitter is, by implication, impressed upon the carrier as a single baseband channel. However, coherent receivers rotate the phase of the local oscillator so that it appears to be in-phase with the received signal carrier; the quadrature component of the carrier contains noise only. It is clearly possible to place independent information on the quadrature carrier, thus enabling a factor of two increase (i.e., doubling) in data rate. Clearly, if coherent reception can be effected this factor of two can also be applied to M-Orthogonal, M-Antipodal, and other variant-orthogonal modulations as well.

These and other modifications will be more apparent hereinafter.

Figure 2:
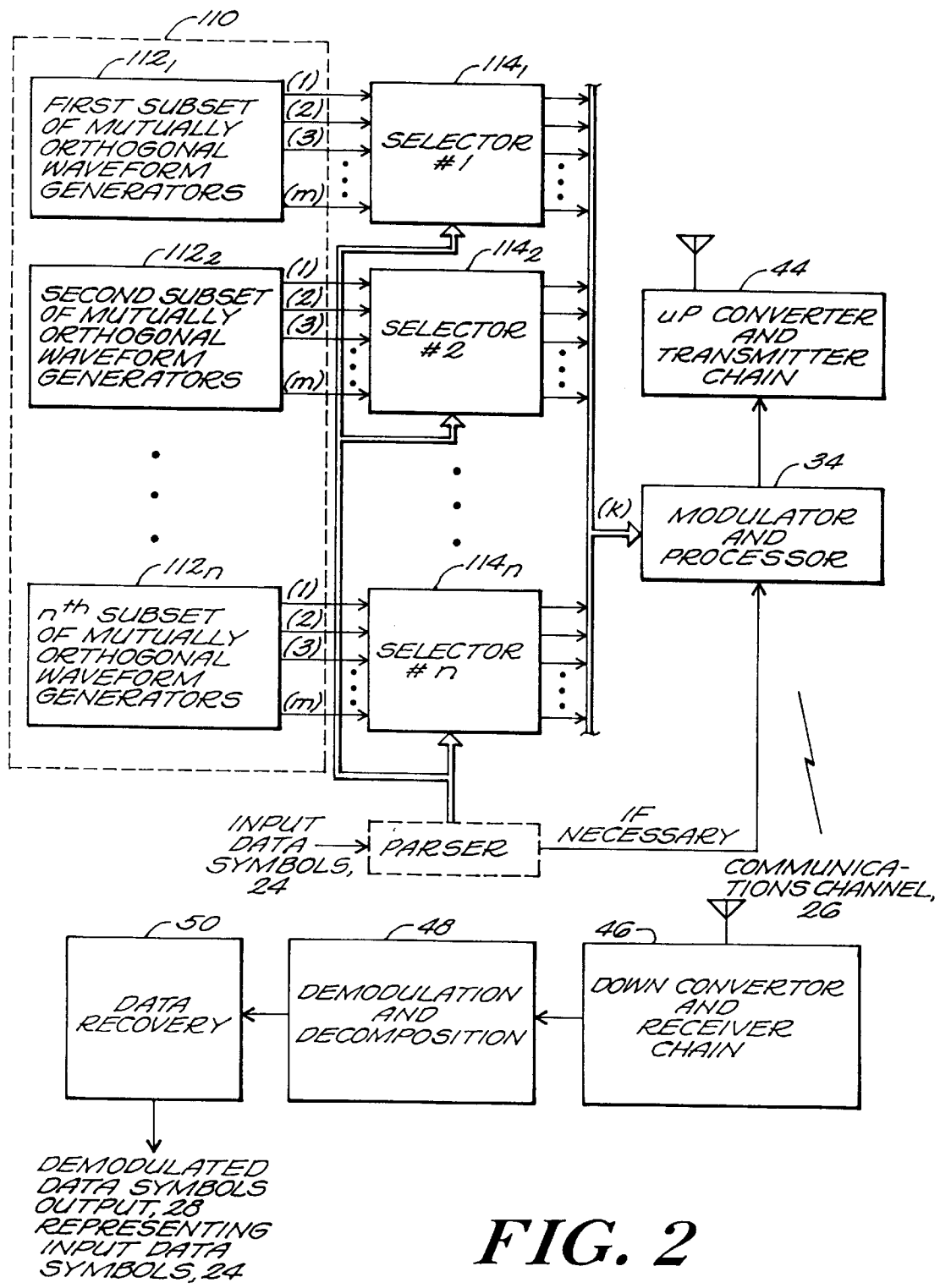
FIG. 2 is a simplified block diagram of another embodiment of a data communications system designed in accordance with the present invention.

For example, in FIG. 2 an exemplary embodiment is shown in which the basis waveform functions are separated into subgroups. In this embodiment, the embodiment of FIG. 1 is modified so that the set of mutually orthogonal signaling component waveforms generated by the generators (generally indicated at 110) are organized so as to include n subsets 112, each of m predetermined waveforms. In addition, a separate selector 114 is provided for each subset 112. For each input data symbol, each selector 114 selects at least one component waveform from the corresponding subsets 112 as a function of the input data symbols 24 so as to produce K selected component waveforms. In the illustrated embodiment, where one waveform is selected from each subgroup K=n. However, where, for example, two waveforms are selected from each subgroup, K=2n; selecting three waveforms from each subgroup results in K=3n, and so on.

Thus, by way of example, in FIG. 2 assume the set of mutually orthogonal waveforms includes 16 Walsh functions, subdivided into four subsets of four. In this embodiment, each selector 114 selects one Walsh function from each of the four groups as a function of at least one of the selected data elements, to produce a selected set of four Walsh functions. Four sets of four waveforms allows $4^4=256$ possible combinations of one selection from each subset, so each selection of four waveforms from the waveform set can convey 8 bits of information. This is true because each set of four selected waveforms represents one symbol from an alphabet size of $256=2^{12}$. Equivalently stated, each subgroup produces a waveform which represents one symbol from an alphabet size of $4=2^2$, conveying 2 bits of information. Four subgroups together convey 4·2=8 bits of information. In this instance, K=n. It should be noted that more than one waveform can be selected from each subgroup, in which case K equals a multiple of n.

As previously stated, the number of waveforms transmitted can be increased by a factor of two (by an additional bit) by using signal phase. In one such embodiment of the invention, the size of each of the subsets is increased by a factor of two by including the inverse or phase version of each of the Walsh functions. In the given example, four sets of eight waveforms allows $8^4=4096$ possible combinations of one selection from each subset, so each selection of four waveforms can convey 12 bits of information. Equivalently stated, each subset produces a waveform which represents one symbol from an alphabet size of $4=2^3$, conveying 3 bits of information. Four subsets together convey 4·3=12 bits of information.

In yet another embodiment of the invention, the extra bit per subset is conveyed by inverting or not inverting the selected waveform from each of four subsets of four prior to being combined by the modulator and processor 34. In the example given, this is equivalent to the aforementioned four subsets 112 of eight Walsh functions, without having to store eight Walsh functions per subset 112 or having to incorporate means for generating eight Walsh functions per subset 112. Selected inversion can be accomplished, for example, using PSK and DPSK encoding techniques.

Figure 3:
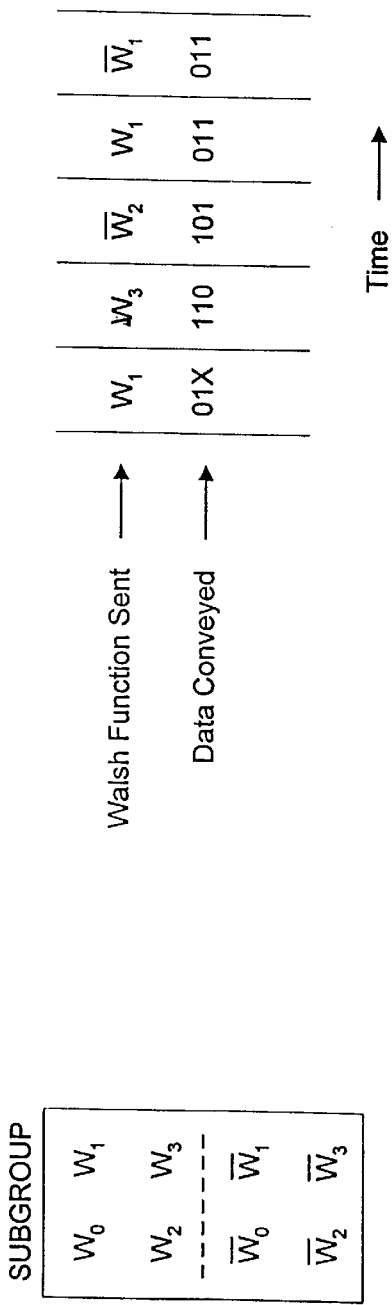
FIG. 3 illustrates an exemplary case of the differential inversion technique of conveying an additional bit of information.

FIG. 3 illustrates an exemplary case of the differential inversion technique of conveying an additional bit of information which can be used in both the FIG. 1 and FIG. 2 embodiments. The subgroup is shown to include four Walsh functions in the non-inverted section designated $W_0, W_1, W_2$ and $W_3$. The Walsh functions in the inverted section are designated $\overline{W}_0, \overline{W}_1, \overline{W}_2$ and $\overline{W}_3$. In this example, the first two bits of the data conveyed is carried by the Walsh function itself, and the third bit is conveyed by the relationship between the adjacent functions. In FIG. 3, the first three-bit character has an "X" in the third place because the previous character is not given, and so the third bit cannot be determined. Such a differential inversion technique allows the use of a non-coherent receiver; i.e., one which does not need to distinguish between a particular Walsh function and its inverted version in order to extract the additional bit of information.

Figure 4:
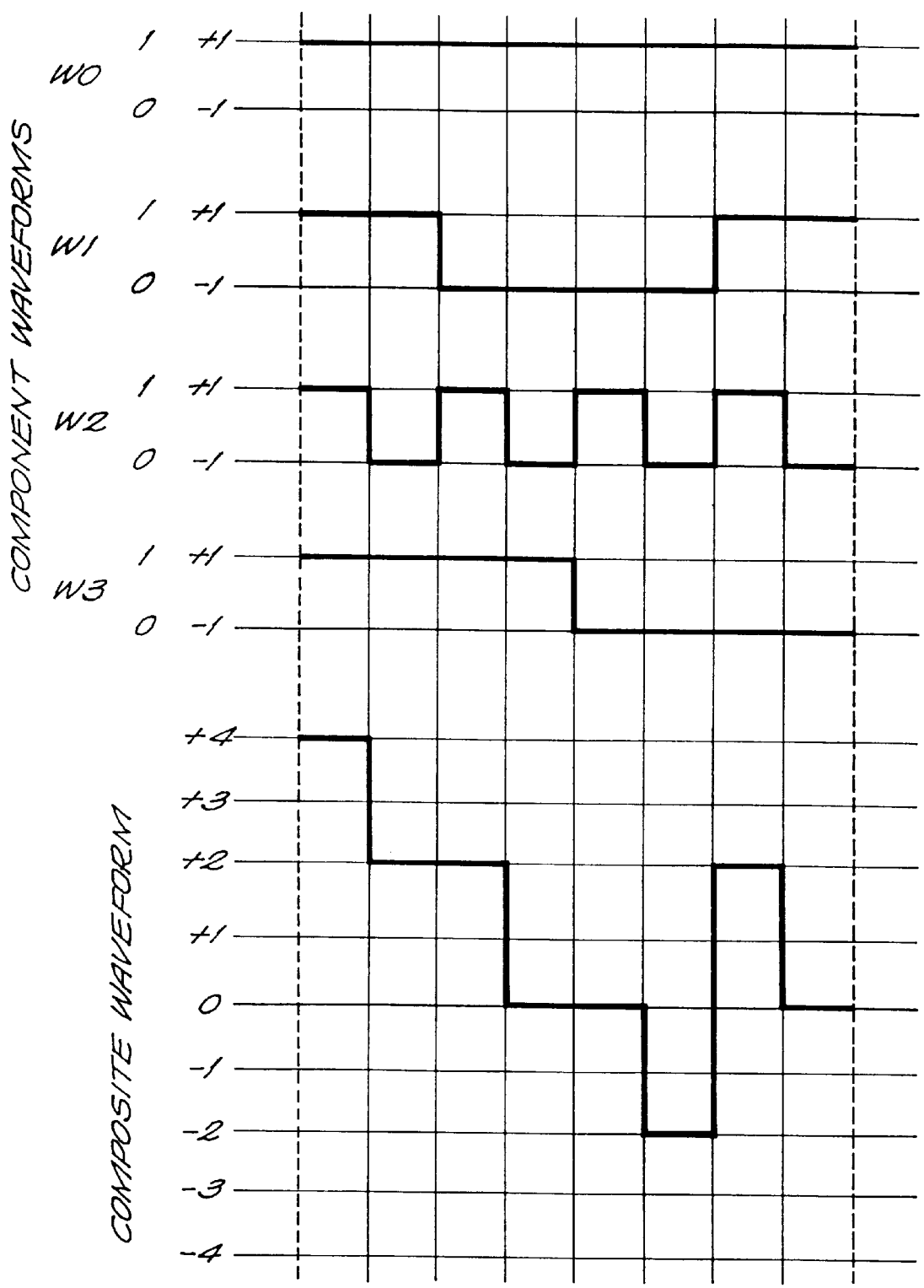
FIG. 4 illustrates a linear summation of four representative Walsh functions to produce a multilevel component signal.

In general, as previously mentioned the modulator and processor 34 includes a linear or non-linear function which combines contemporaneous portions of the selected waveforms to produce a composite waveform. In one form of the invention, the modulator and processor 34 includes linear summing means for summing contemporaneous portions of the n selected waveforms. Such summing means is generally characterized by a continuous operator; i.e., one which continuously sums along all of the selected waveforms. However, those skilled in the art will recognize that a discrete summer may also be used; i.e., one which treats the selected waveforms as collections of discrete samples, wherein contemporaneous samples from the selected waveforms are summed to produce a composite waveform made up of a series of discrete samples. In one embodiment of the invention, the modulator and processor 34 receives the four selected Walsh functions as digital waveforms; i.e., waveforms represented by either a zero or a one, and a digital zero state is treated as a +1 amplitude for summation, and a digital one state is treated as a −1 amplitude for summation. FIG. 4 illustrates a linear summation produced by this embodiment for four representative Walsh functions. In the illustrated case, the composite waveform has a multi-level amplitude with possible values of +4, +2, 0, −2 and −4.

In accordance with another embodiment of the invention, the possible combinations of waveforms can be predefined and limited so that any possible combined signal will remain bi-level, e.g., +1 and −1. Where, for example, four subsets, each of four standard Walsh functions are used, and by using phase inverted waveforms to double the number of bits/symbol, the restricted waveforms will be limited to three waveforms, a combination of two Walsh functions and one for phase. This has the effect of reducing the number of bits/symbol from 12 to 9, but allows for more efficient use of the power amplifier for transmitting the transmitted signal since the modulated transmitted signal will have a constant envelope, irrespective of sign, and the power amplifier can be driven between saturated and off states (for the two values). Decreasing the number of bits/symbol from 12 to 9 provides a decrease in throughput to one-quarter of the throughput using the 12 bits/symbol multi-level approach, but the number of waveforms used to provide the constant envelope modulated output is only one-eighth of the number of waveforms in the 12 bit/symbol multi-level approach; in some applications a good tradeoff.

As previously described, in another embodiment of the invention a pseudo-random noise (hereinafter referred to as "PN") modulation is added to the waveforms after the selected waveforms have been combined, although those skilled in the art will realize that because of the linear associative property, the PN modulation may be added prior to the combination as long as the modulator and processor 34 includes a linear function which combines contemporaneous portions of the selected waveforms to produce a composite waveform (e.g., linear summation), rather than a non-linear function. The latter is shown, for example in FIGS. 5, 6 and 7, wherein exclusive OR gates 120 are used to add a binary PN code to each output of each selector 114. PN modulation provides processing gain against an interfering signal with the same or similar data modulation properties and assures minimum modulation bandwidth characteristics of the carrier transmitted by the invention. Because the PN code is pseudo-random and the ratio of the orthogonal waveform length to the smallest PN chipping rate is large, two identical waveforms with different PN overlays are for all practical purposes orthogonal and therefore distinguishable from one another.

As previously described, additional bits can be encoded in the composite waveform by selectively inverting each of the component waveforms to create a larger set of component waveforms to make the composite waveforms. Thus, in still another embodiment of the invention, also illustrated by way of example in FIG. 5, an additional bit per subgroup can be encoded in the composite waveform by a differential inversion technique similar to Differential Phase Shift Keying (hereinafter referred to as "DPSK"). In the example shown, the waveforms produced by each subset of waveform generators 112 include four Walsh functions. By providing the output(s) of each output of each selector(s) 114 to the input of an exclusive OR gate 122, a DPSK modulation signal can be provided to the output waveforms of the selectors so that the gate provides either the waveform output of the corresponding selector, or the inverse of the waveform. In the example, the waveforms provided by the selectors and their inverse forms therefore provide a total of eight waveforms per subset 112. However, with the differential inversion technique, selecting a particular function or its inverse only conveys two bits of information. An additional bit is conveyed by the relationship between the current waveform and the previous waveform. Each subset may be viewed as having an inverted section and a non-inverted section. In general, if the current and previous waveforms are selected from the same section (either both inverted or both non-inverted), one sense of the bit is conveyed (e.g., a digital zero). If the current and previous waveforms are selected from different sections, the other sense of the bit is assumed (e.g., a digital one).

It should be appreciated that in addition to DPSK, other modulation techniques can be used to address one or more bits/symbol. For example, in another embodiment shown in FIG. 6, the carrier modulation includes phase shift keying (hereinafter referred to as PSK). In this embodiment exclusive OR gates 112 are used to modulate each output waveform of each selector 114 with a PSK modulation signal. It should be appreciated that alternatively the PSK modulation signal can be applied to the output of the signal summer 36.

As previously described other techniques can be used to encode additional data within each composite waveform.

Figure 7:
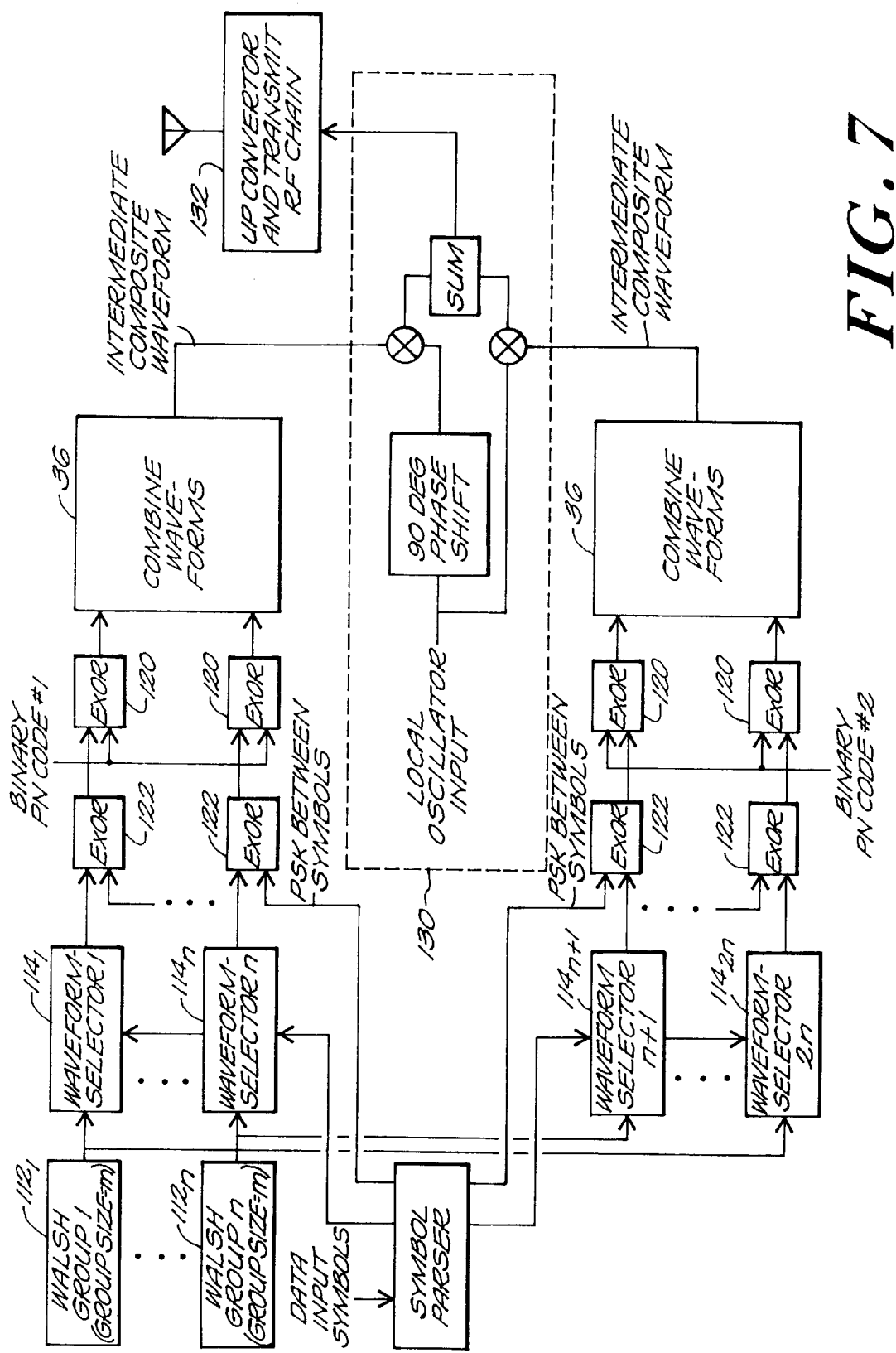
FIG. 7 is a simplified block diagram of another embodiment of a transmitter subsystem of a data communications system using quadrature phase modulation to increase the number of bits/symbol.

For example, in accordance with another embodiment of the invention, shown in FIG. 7, additional data can be simultaneously transmitted with modulator 130, which can be used for modulating the quadrature component of the carrier signal with one intermediate composite waveform, and the in-phase component of the carrier with another intermediate composite waveform, thus sending data via two different, independent carrier phases. In such a system, the receiver element is coherent, i.e., it recovers information regarding the received carrier signal's phase, and so it can distinguish between the in-phase and quadrature components of the signal. As shown in FIG. 7, the waveforms modulated on each phase of the carrier also may, although not necessarily, be overlaid with independent PN codes, with the use, for example, of exclusive OR gates 120, to add processing gain to one carrier phase against the signal on the other carrier phase when the receiver has imperfect phase alignment with the transmitter. The embodiment may also use other modulation techniques as previously described, wherein, for example, PSK modulation is shown in the FIG. 7 embodiment. In the example given wherein n=4 and m=4, the composite waveform can convey 12 bits of information (one selected waveform per group of four waveforms gives two bits per group; four groups gives eight bits; a set of inverted waveforms for each of four groups gives extra bit per group for a total of 12 bits), sending data via two phases of the carrier provides a throughput of 24 bits per composite waveform period.

In FIG. 7 the set of waveforms provided by the waveform generators are represented by "n" subsets of Walsh generators, each subset for generating "m" unique waveforms, where n represents the subset index and m represents the waveform index within the $n^{th}$ subset. Where n=4 and m=4, a set of eight waveform selectors 114 are provided. The symbol parser 42 provides instructions to the selectors as well as to two sets of exclusive-or gates 122. A pair of waveform combiners 36 combine the four received waveforms. The modulator 130 is represented as a quadrature phase shift keying (hereinafter referred to as "QPSK") modulator 130, the output of which is connected to a transmitter represented as a transmit block and an antenna 132. It should be appreciated that the embodiment shown in FIG. 7, can be modified to use DPSK combined with in-phase and quadrature modulation techniques to encode the resulting composite waveform with twice as many bits/symbol than provided by the FIG. 5 embodiment. The transmit block may include such radio frequency (hereinafter referred to as RF) front end components as an amplifier, an up-converter and a spectrum-shaping filter, but those skilled in the art will realize that alternate transmitter architectures may be used.

Figure 5:
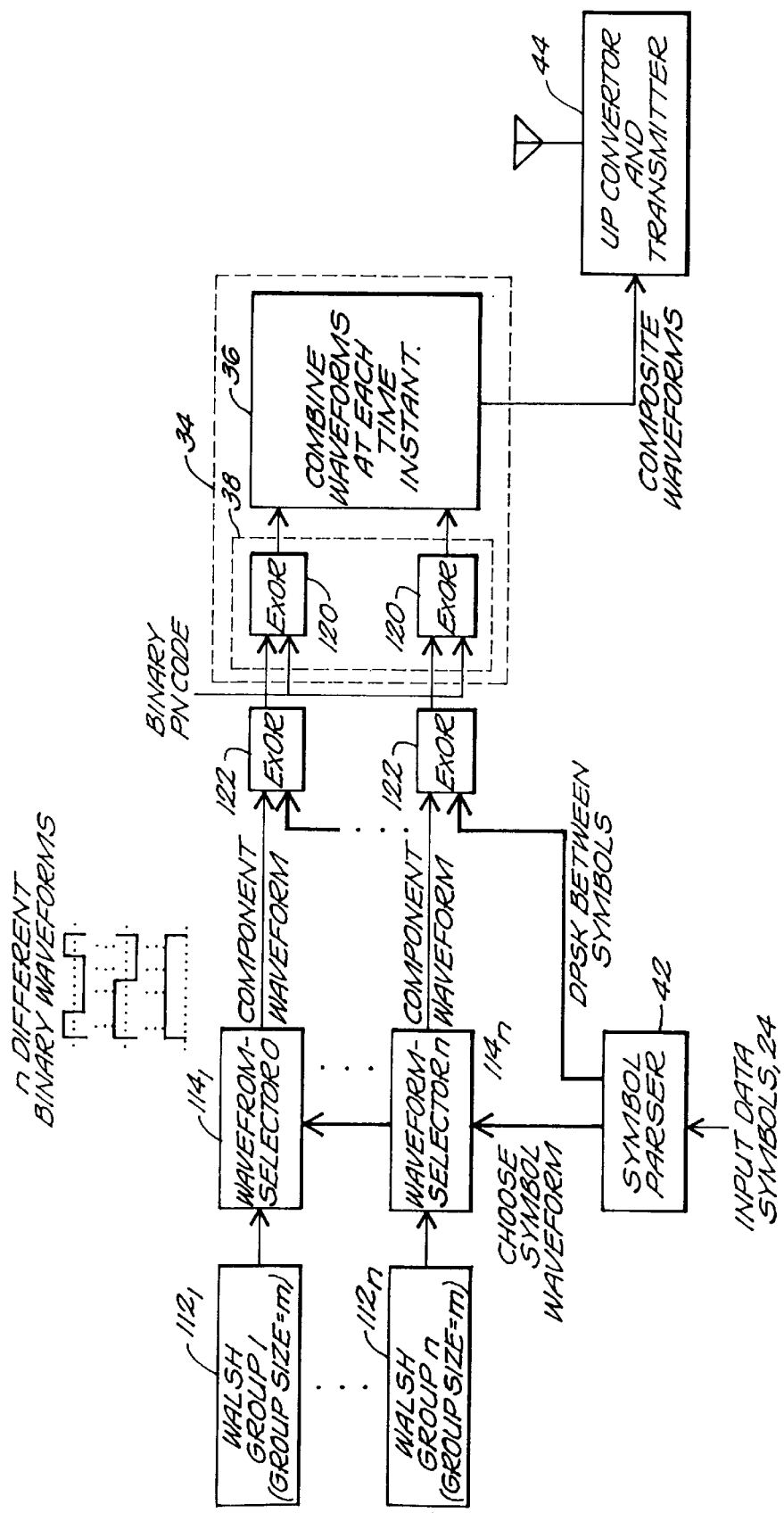
FIG. 5 is a simplified block diagram of another embodiment of a transmitter subsystem of a data communications system and using DPSK and PN coding techniques.
Figure 6:
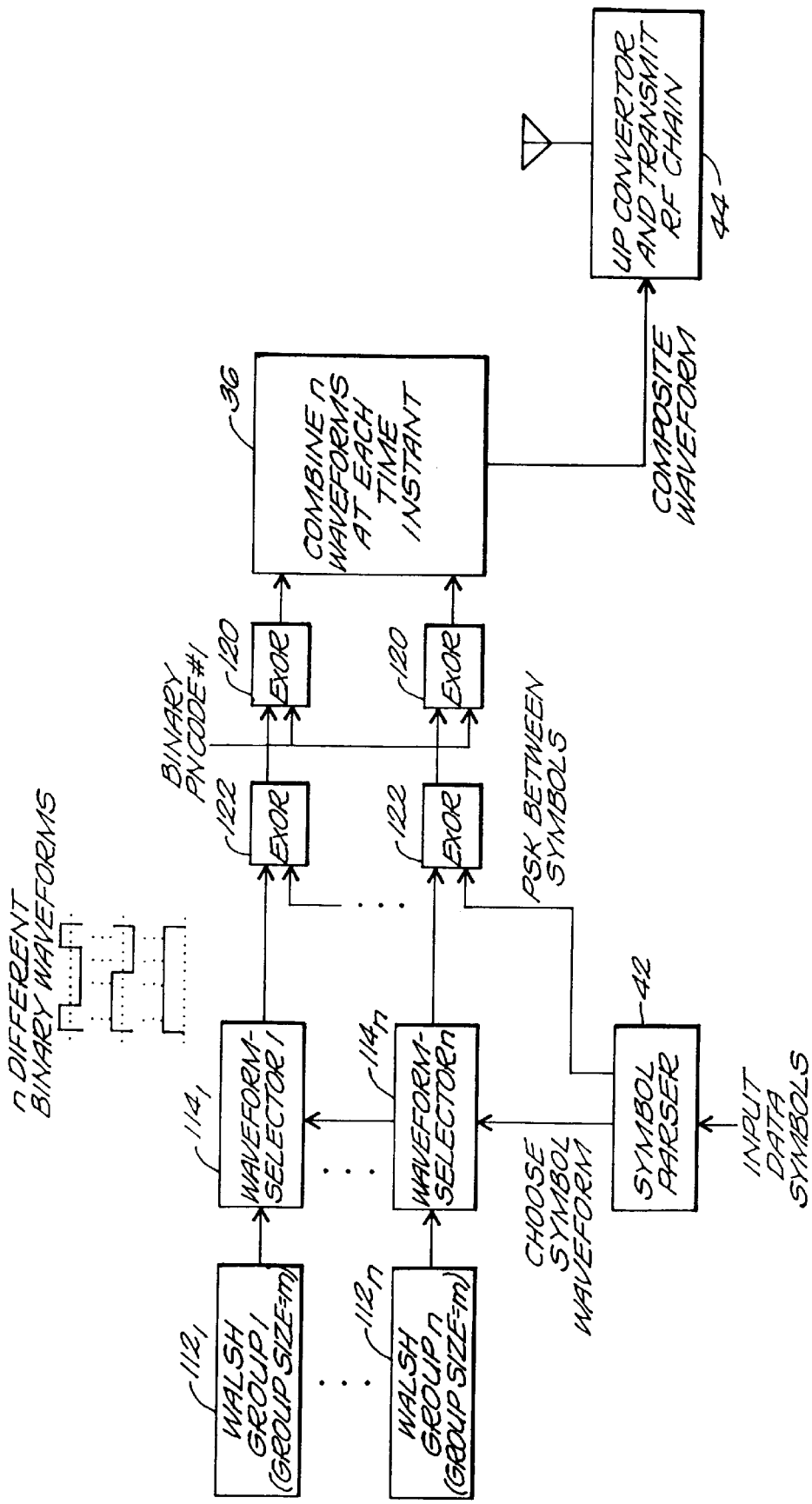
FIG. 6 is a simplified block diagram of another embodiment of a transmitter subsystem of a data communications system using PSK and PN coding techniques.

It should be appreciated that the embodiments described in connection with FIGS. 5, 6 and 7 are described in connection with the FIG. 2 embodiment wherein n subsets are used, the additional encoding techniques can also be applied to the FIG. 1 embodiment, i.e., K of M waveforms.

Figure 8:
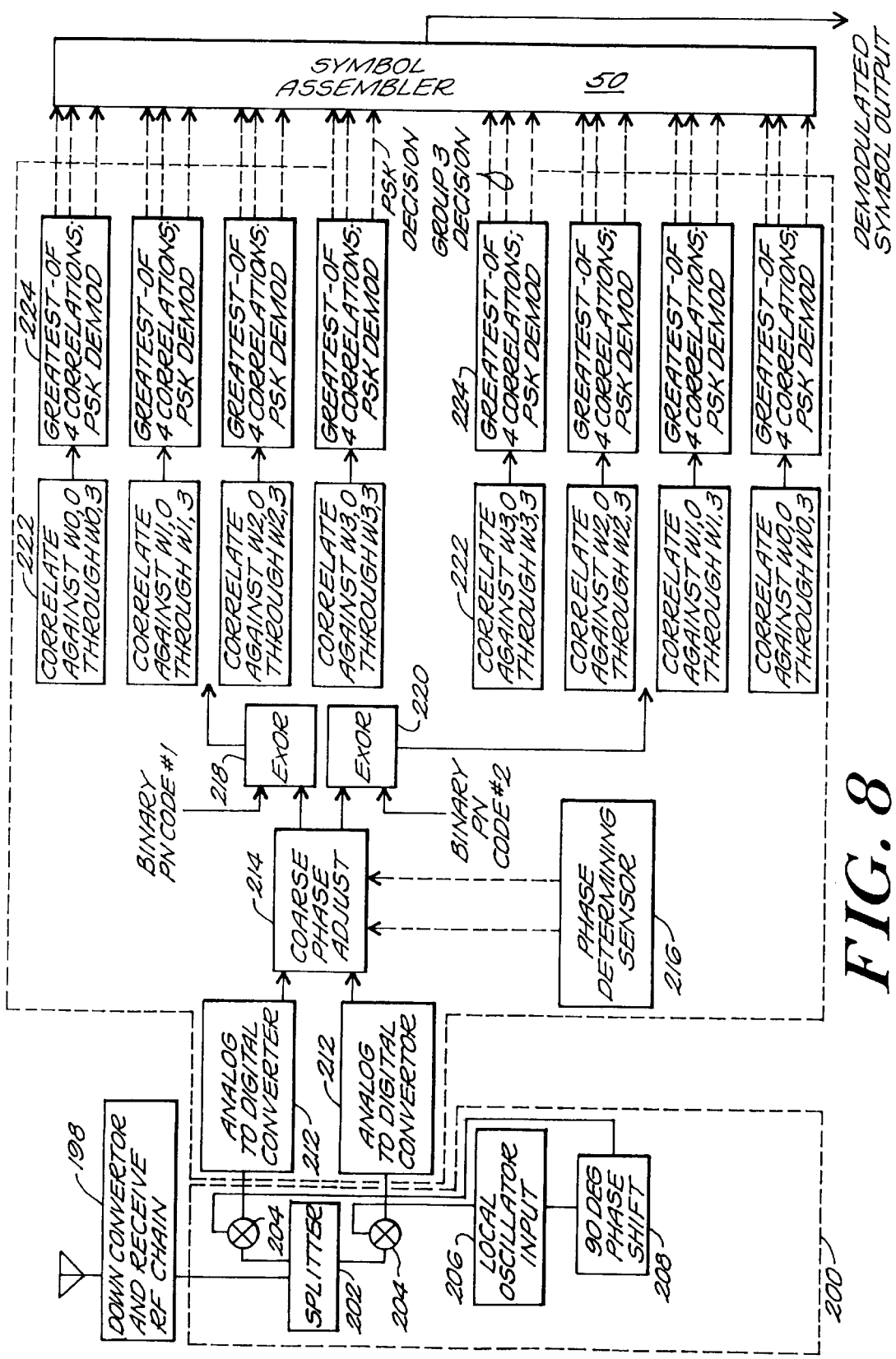
FIG. 8 is a simplified block diagram of another embodiment of a receiver subsystem of a data communications system using PSK, PN and quadrature phase modulation coding and demodulation decoding techniques.

FIG. 8 shows a block diagram of a preferred embodiment of the receiver subsystem useful with and is the complement to the FIG. 7 transmitter subsystem. The receiver subsystem includes an antenna and a receive chain 198. The receive chain may include such RF components as a receive filter, a low noise amplifier and a down converter, although those skilled in the art will recognize that other receiver front end architectures may be used. The receive chain couples the propagating transmission signal from the communications channel to produce a received carrier signal. A demodulator 200 receives the received carrier signal to recover the composite waveform embedded in the carrier signal by the transmitter subsystem. The demodulator 200 of the illustrated embodiment is a quadrature demodulator known to those skilled in the art, including a signal splitter 202, a pair of RF mixers 204, a local oscillator (hereinafter referred to as "LO") 206, and a signal phase shifter 208 to provide a quadrature version of the LO signal. One of the mixers mixes the carrier signal with the LO signal to produce an in-phase demodulated signal channel, and one of the mixers mixes the carrier with the quadrature version of the LO signal to produce a quadrature demodulated signal channel.

A decompositioner, indicated generally as 210, includes analog to digital converters (ADCs) 212, for respectively digitizing the in-phase demodulated signal to produce a sampled in-phase signal and the quadrature demodulated signal to produce a sampled quadrature signal. The two sampled signals are phase-adjusted via a coarse phase adjuster 214 based on the phase of the signals sensed by the sensor 216 during a preamble in the transmitted waveform such that the processing in the correlators 222 are as if the LO were phase-aligned with the in-phase path. Only a coarse adjustment is necessary because the in-phase and quadrature path signals have different PN overlays, and the processing gain afforded by the PN overlay on one path will mitigate crosstalk from the other path due to imperfect phase alignment. The amount of coarse adjustment is that which is normally provided with typical QPSK demodulation. Following coarse phase adjustment, the decompositioner 210 strips the proper PN code from the corresponding path with the exclusive OR gates 218 and 220. In the illustrated embodiment gates 218 and 220 are used to serially multiply each of the sampled signal streams by the proper PN code, although those skilled in the art will realize that other methods of PN stripping may be used, such as parallel multiplication of a section of the sampled signal stream by the entire PN code. After the PN has been stripped from each of the sampled signal streams, each stream is correlated against all of the Walsh functions in the four subsets using the correlators 222, since n=4 in the example. The correlators 222 of decompositioner 210 identify the Walsh function producing the highest correlation value from each of the four subsets and outputs the Walsh function designation corresponding to this identification as indicated at 224. The decompositioner 210 also provides PSK demodulation and determines at blocks 224 whether the identified Walsh function is from the same waveform section (i.e., either both inverted or both non-inverted) or from the opposite waveform section (i.e., one from the inverted section and one from the non-inverted section) with respect to the previous waveform, and extracts an additional bit from this relationship as defined herein and as indicated at 226. The data recoverer 50 includes a symbol assembler 228 which receives the Walsh function designations and the adjacent waveform relationship information from the decompositioner 210 and produces a series of output data elements 28. The data recoverer 50 utilizes the same data element-to-Walsh function relationship employed by the selector 114 of the transmitter subsystem in order to produce the output data elements 28. Although the embodiment shown in FIG. 8 is illustrated as useful in decompositioning waveforms provided as four subsets, each of four waveforms, the numbers can clearly vary.

Figure 9:
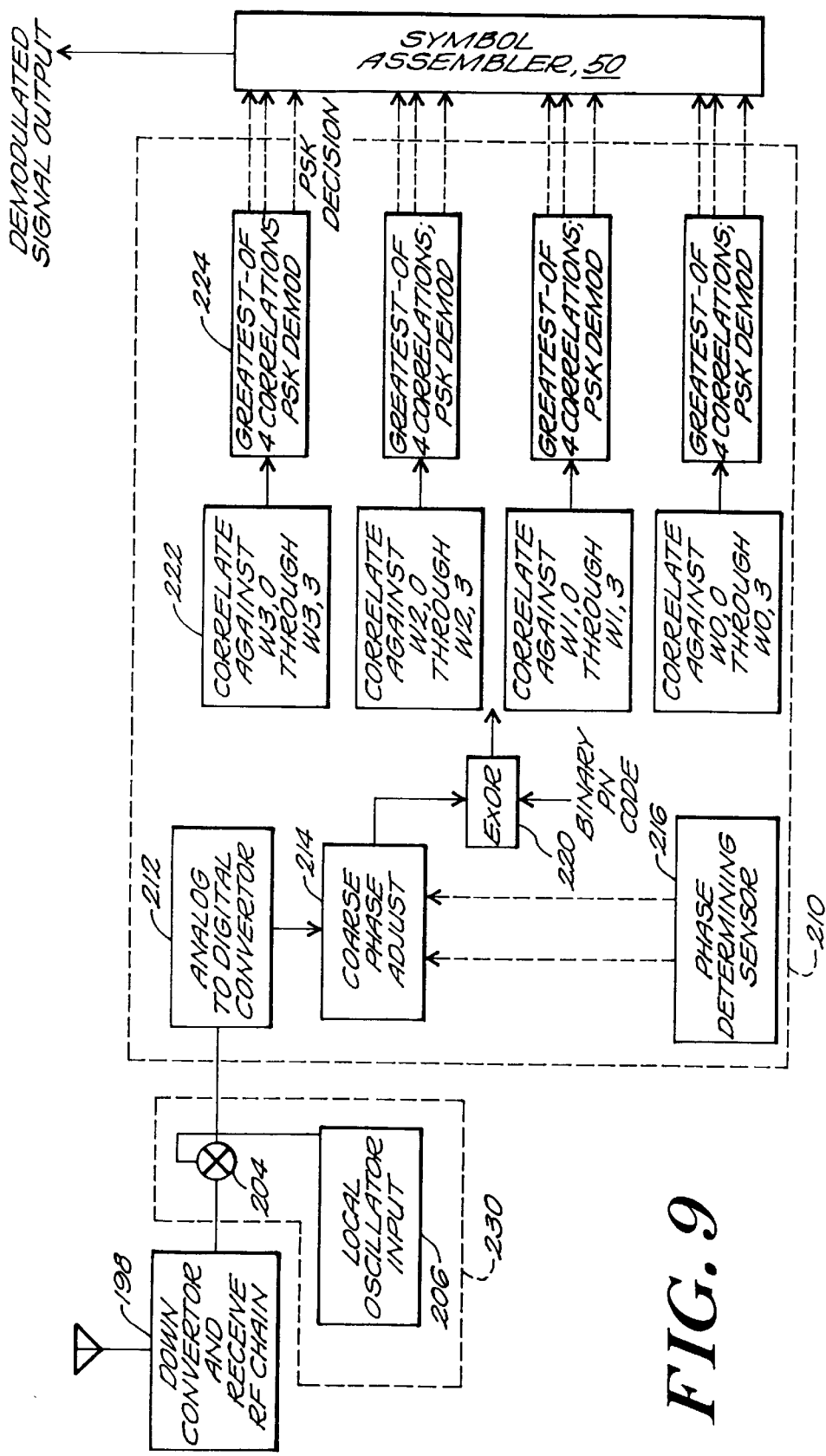
FIG. 9 is a simplified block diagram of another embodiment of a receiver subsystem of a data communications system using PSK and PN modulation coding and demodulation decoding techniques.

In FIG. 9, the embodiment of FIG. 8 is modified to process PSK encoded signals transmitted, for example by a transmit subsystem such as the one shown in FIG. 6. Note that the demodulator 200 is modified as indicated at 230, to process only one composite waveform since the quadrature phase modulation is not used. In this embodiment, the splitter 202, the phase shifter 208 and one mixer 204 is eliminated.

Figure 10:
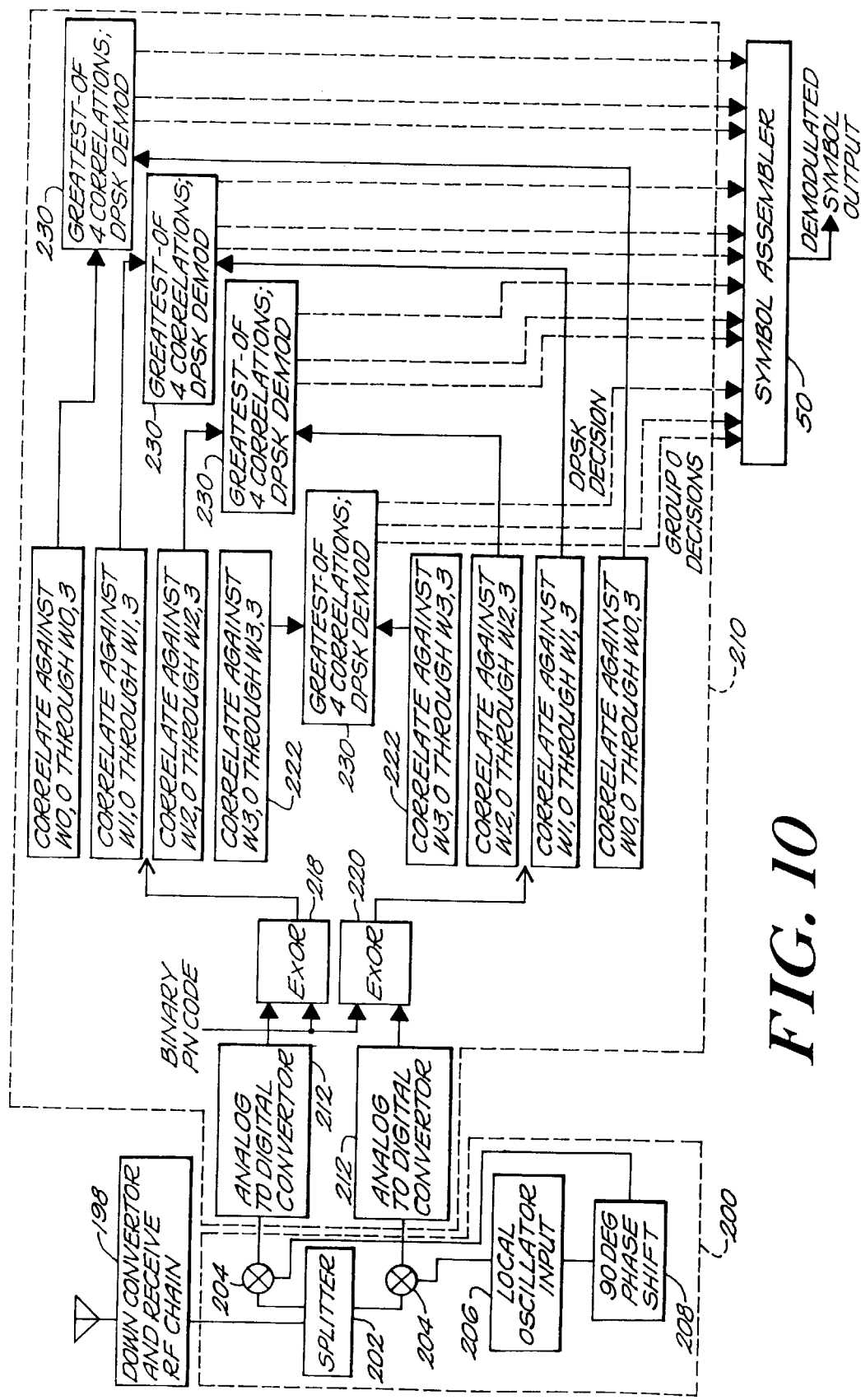
FIG. 10 is a simplified block diagram of another embodiment of a receiver subsystem of a data communications system using DPSK and PN coding techniques.

Finally, in FIG. 10, an embodiment of a receiver is illustrated which can be used to demodulate 4 subsets of 4 with DPSK resulting in 12 bits per symbol, although these numbers can clearly vary. The FIG. 9 embodiment can be used, for example, to complement the transmitter subsystem shown in FIG. 5, and is similar to the FIG. 8 embodiment, except that only one PN code is stripped from the output of the converters 212, and the DPSK demodulation is provided at 230, to identify the relationship between the current and previous waveforms for each subset. The phase sensor 216 and coarse phase adjuster 214 is not necessary. Thus the greatest magnitude from among the four in each subset will correspond to the transmitted waveform for that group. The bipolar in-phase and quadrature-phase correlator outputs for the greatest amplitude output will be used in the complex multiply for the DPSK demodulation. Those values will also be stored as the reference value for the DPSK of the next symbol.

The data communications system thus described provides a highly reliable, data communications system providing fast data rates while maintaining power efficiency with robustness in the presence of a multipath environment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of generating a group of unique composite waveforms corresponding to input data symbols for transmitting data represented by the symbols through a transmission medium, wherein each of the composite waveforms is derived as a function of:

(A) selecting K waveforms from a set of M mutually orthogonal component waveforms so as to produce K selected component waveforms for each of the data symbols, wherein $2 \leq K \leq M-1$; and (B) processing contemporaneous portions of the K selected component waveforms so as to produce, at least in part, the composite waveform representative of the symbol.

2. A method according to claim 1, wherein each of the composite waveforms is derived as a function of:

(A) grouping the M component waveforms into n subsets, each subset including m component waveforms;

(B) selecting at least one waveform from each subset of n subsets of said waveforms so as to produce K selected orthogonal component waveforms; and (C) processing contemporaneous portions of said K selected orthogonal component waveforms so as to produce the composite waveform representative of at least a part of the symbol.

3. A method according to claim 2, wherein each of said composite waveforms is used to modulate a carrier signal so as to produce a modulated carrier signal for transmitting the composite waveform through the transmission medium.

4. A method according to claim 3, wherein said composite waveform is derived from two intermediate composite waveforms, which in turn are each at least in part derived from K selected component waveforms, and the modulated carrier signal is produced as a function of:

(A) simultaneously transmitting the two intermediate composite waveforms respectively through an in-phase path and a quadrature path coupled to one another so as to produce an in-phase modulated waveform and a quadrature modulated waveform, the two modulated waveforms being 90° out of phase with respect to one another; and (B) combining the in-phase modulated waveform and the quadrature modulated waveform so as to produce a quadrature phase modulated carrier signal.

5. A method according to claim 4, wherein the intermediate waveform from said in-phase path is encoded with a first spreading function, and the intermediate waveform from the quadrature path is encoded with a second spreading function.

6. A method according to claim 4, wherein the individual component waveforms can be selectively inverted so as to create a larger set of possible composite waveforms.

7. A method according to claim 2, wherein said composite waveform is derived from two intermediate composite waveforms, which in turn are each at least in part derived from K selected component waveforms, and the individual component waveforms can be selectively inverted so as to create a larger set of possible composite waveforms.

8. A method according to claim 7, wherein the component waveforms are selectively inverted using PSK techniques.

9. A method according to claim 7, wherein the component waveforms are selectively inverted using DPSK techniques.

10. A method according to claim 2, wherein said orthogonal component waveforms include Walsh functions.

11. A method according to claim 10, wherein n and m each equal 4 so that said set of M component waveforms includes four subsets, each having four of said Walsh functions.

12. A method according to claim 10, wherein n equals 2 and m equals 8 so that said set of M component waveforms includes two subsets, each having eight of said Walsh functions.

13. A method according to claim 1, wherein the component waveforms are chosen so that the composite waveform is produced so as to have only two possible amplitude levels.

14. A method according to claim 1, wherein the component waveforms are chosen so that the composite waveform is produced so as to have at least three possible amplitude levels.

15. A method according to claim 1, wherein said composite waveform is multiplied by a spreading function.

16. A method according to claim 1, wherein each of said K selected component waveforms is multiplied by a spreading function so as to produce K spread waveforms, prior to producing said composite waveform.

17. A data communications system for transferring composite waveforms, representing at least in part a series of input data symbols, through a transmission medium, said system comprising:

(a) a generator subsystem constructed and arranged as to generate each component waveform of a set of M mutually orthogonal component waveforms;

(b) a component waveform selection subsystem constructed and arranged so as to select, as a function of each of said data symbols, a predetermined number (K) of said component waveforms so as to produce K selected component waveforms for each of said data symbols, wherein $2 \leq K \leq M-1$; and (c) a processing subsystem constructed and arranged so as to produce a composite waveform as a function of the combined contemporaneous portions of said K selected component waveforms.

18. A data communications system according to claim 17, wherein
said generator subsystem includes a component waveform generator subsystem constructed and arranged so as to generate a group of at least n subsets of said component waveforms, wherein each subset includes m component waveforms;
said component waveform selection subsystem includes a waveform selection subsystem constructed and arranged so as to select, as a function of each of said data symbols, at least one waveform from each of said n subsets of said component waveforms so as to produce K selected component waveforms corresponding to a respective one of said data symbols; and
said processing subsystem includes a waveform processor constructed and arranged so as to process contemporaneous portions of said K selected component waveforms so as to produce said composite waveform.

19. A data communications system according to claim 18, further including
a modulator subsystem constructed and arranged so as to modulate a carrier signal as a function of said composite waveform so as to produce a modulated carrier composite signal and transmission means for transmitting said modulated carrier composite signal through said transmission medium.

20. A data communications system according to claim 19, wherein said composite waveform is derived from two intermediate composite waveforms, which in turn are each at least in part derived from K selected component waveforms,
said modulator subsystem further includes an in-phase path and a quadrature path coupled to one another so that simultaneously transmitting the two intermediate composite waveforms respectively through the in-phase path and the quadrature path produces an in-phase modulated waveform and a quadrature modulated waveform, the two modulated waveforms being 90° out of phase with respect to one another; and
further including a waveform combiner constructed and arranged so as to combine the in-phase modulated waveform and the quadrature modulated waveform so as to produce a quadrature phase modulated carrier signal.

21. A data communications system according to claim 20, wherein the intermediate waveform from said in-phase path is encoded with a first spreading function, and the intermediate waveform from the quadrature path is encoded with a second spreading function.

22. A data communications system according to claim 18, further including a waveform inverter subsystem constructed and arranged so as to selectively invert each of said component waveforms so as to create a larger set of possible composite waveforms.

23. A data communications system according to claim 18, wherein said group of at least n subsets of said component waveforms includes Walsh functions.

24. A data communications system according to claim 23, wherein n and m each equal 4 so that said set of M waveforms includes four subsets, each having four of said Walsh functions.

25. A data communications system according to claim 17, further including a waveform inverter subsystem constructed and arranged so as to selectively invert each of said component waveforms so as to create a larger set of possible composite waveforms.

26. A data communications system according to claim 25, wherein the waveform inverter subsystem includes a waveform modulator subsystem constructed and arranged so as to selectively modulate each of said component waveforms using PSK techniques.

27. A data communications system according to claim 25, wherein the waveform inverter subsystem includes a waveform modulator subsystem constructed and arranged so as to selectively modulate each of said component waveforms using DPSK techniques.

28. A data communications system according to claim 17, wherein said processing subsystem includes a waveform summing subsystem constructed and arranged so as to sum contemporaneous portions of K selected component waveforms, so as to produce a composite waveform having only two distinct amplitude levels.

29. A data communications system according to claim 17, wherein said processing subsystem includes a waveform summer constructed and arranged so as to sum contemporaneous portions of K selected component waveforms, so as to produce a composite waveform having at least three distinct amplitude levels.

30. A data communications system according to claim 17, wherein said processing subsystem includes an encoder constructed and arranged so as to encode said composite waveform with a spreading function.

31. A data communications system according to claim 17, wherein said processing subsystem includes an encoder constructed and arranged so as to encode each of said K selected component waveforms with a spreading function, so as to produce K spread waveforms, prior to producing said composite waveform.

32. A data transmission system according to claim 17, further including
a waveform modulator subsystem constructed and arranged so as to modulate a carrier signal as a function of said composite waveform so as to produce a modulated carrier composite signal and a transmitter subsystem constructed and arranged so as to transmit said modulated carrier composite signal through said transmission medium;
a receiver constructed and arranged so as to receive said modulated carrier composite signal so as to produce a received carrier signal;
a demodulator constructed and arranged so as to demodulate said received carrier signal so as to reproduce said composite waveform;
a decomposition subsystem constructed and arranged so as to decompose said composite signal in order to reproduce K received component waveforms corresponding to said K selected waveforms; and
a symbol reproducer constructed and arranged so as to reproduce the input data symbol as a function of said K selected component waveforms.

33. A data communications system according to claim 32, wherein said demodulator includes an in-phase demodulation path and a quadrature demodulation path.

34. A data communications system according to claim 32, wherein said demodulator further includes a spreading function stripper subsystem constructed and arranged so as to strip a spreading function from said composite waveform in said in-phase demodulation path and from said composite waveform in said quadrature demodulation path.

35. A data communications system according to claim 32, wherein said decomposition subsystem includes a waveform correlator constructed and arranged so as to correlate said composite waveform against all of said component waveforms from said subsets so as to produce a highest correlation result from each subset, and selecting a correlated component waveform corresponding to said highest correlation result from each of said n subsets so as to produce K correlated component waveforms, wherein said produced K correlated component waveforms are representative of a corresponding one of said data symbols.

36. A data communications system according to claim 35, wherein said decomposition subsystem further includes a waveform detector constructed and arranged so as to detect inverted waveforms.

37. A data communications system for receiving data symbols transferred as predefined composite waveforms through a transmission medium, wherein each composite waveform is derived, at least in part, as a function of:
(A) selecting K waveforms from a set of M mutually orthogonal component waveforms so as to produce K selected waveforms for each of said data symbols, wherein $2 \leq K \leq M-1$; and
(B) processing contemporaneous portions of said K selected waveforms so as to produce, at least in part, the composite waveform representative of the symbol, and said composite waveform is used to modulate a carrier signal so as to produce a modulated carrier composite signal for transmitting the composite waveform through the transmission medium;

said system comprising:
a demodulator subsystem constructed and arranged so as to demodulate said modulated carrier composite signal so as to reproduce said composite waveform;
a decomposition subsystem constructed and arranged so as to decompose said composite signal in order to reproduce K received waveforms; and
a symbol reproduction subsystem constructed and arranged so as to reproduce said data symbols as a function of said reproduced K received waveforms.

38. A data communications system according to claim 37, wherein each of said data symbols is represented, at least in part, as a composite waveform derived, at least in part, as a function of:
(A) selecting at least one waveform from each subset of n subsets of said component waveforms, wherein each subset includes m component waveforms, so as to produce K selected component waveforms; and
(B) processing contemporaneous portions of said K selected component waveforms representative of at least a part of said symbol.

39. A data communications system according to claim 38, wherein said decomposition subsystem includes a waveform correlator subsystem constructed and arranged so as to correlate said composite waveform against all of said waveforms from said subsets so as to produce a highest correlation result from each subset, and select a correlated waveform corresponding to said highest correlation result from each of said n subsets so as to produce K correlated waveforms being representative of a corresponding one of said data symbols.

40. A data communications system according to claim 38, wherein said decomposition subsystem further includes a waveform detector constructed and arranged so as to detect inverted waveforms.

41. A data communications system according to claim 37, wherein said composite waveform is derived from two intermediate composite waveforms, one modulated in an in-phase path so as to provide an in-phase modulated signal and the other modulated in a quadrature path so as to provide a quadrature modulated signal, wherein said demodulation means includes an in-phase demodulation path for demodulating the in-phase modulated signal so as to provide an in-phase demodulated composite waveform, and a quadrature demodulation path for demodulating the quadrature modulated signal so as to provide a quadrature demodulated composite waveform.

42. A data communications system according to claim 37, wherein said demodulator subsystem further includes a spreading function stripper constructed and arranged so as to strip a spreading function from an in-phase demodulated composite waveform and from the quadrature demodulated composite waveform.

43. A method of transferring data as composite waveforms representing predefined input data symbols, comprising:

A. receiving digital data as data symbols;
B. selecting, as a function of each data symbol K selected waveforms from a set of M mutually orthogonal component waveforms, said selected waveforms being representative of said data symbol;
C. processing contemporaneous portions of said K selected waveforms so as to produce a composite waveform; and
D. modulating a carrier signal as a function of said composite waveform so as to produce a modulated carrier signal and transmitting said modulated carrier signal.

44. A method according to claim 43, wherein
B1. said step of selecting includes the step of selecting, as a function of each data symbol, at least one waveform from each of n subsets of m component waveforms so as to provide said K selected waveforms, said selected waveforms being representative of at least a part of said data symbol; and
C1. said step of processing includes the step of processing contemporaneous portions of said K selected waveforms so as to produce the composite waveform.

45. A method according to claim 44, further including:
E. receiving said modulated carrier signal so as to produce a received carrier signal;
F. demodulating said received carrier signal so as to reproduce said composite signal;
G. decompositioning said reproduced composite signal in order to reproduce said K selected waveforms; and
H. reproducing said data symbols as a function of the reproduced K selected waveforms.

* * * * *